United States Patent
Schiff et al.

(10) Patent No.: US 7,466,894 B2
(45) Date of Patent: Dec. 16, 2008

(54) POWER SUPPLY OUTPUT MONITOR

(75) Inventors: Tod F. Schiff, Portland, OR (US); Rodney J. Goldhammer, Oregon City, OR (US); Gabor T. Reizik, Dublin, CA (US)

(73) Assignee: Semiconductor Components Industries, L.L.C., Phoenix, AZ (US)

( * ) Notice: Subject to any disclaimer, the term of this patent is extended or adjusted under 35 U.S.C. 154(b) by 0 days.

(21) Appl. No.: 11/367,003

(22) Filed: Mar. 1, 2006

(65) Prior Publication Data

US 2006/0263031 A1    Nov. 23, 2006

Related U.S. Application Data

(60) Provisional application No. 60/683,919, filed on May 23, 2005.

(51) Int. Cl.
  *G02B 6/00* (2006.01)
  *G05F 1/00* (2006.01)
(52) U.S. Cl. ........... 385/147; 323/282
(58) Field of Classification Search ......... 323/234, 323/266, 277, 281, 282–290; 324/416; 713/340; 385/147
See application file for complete search history.

(56) References Cited

U.S. PATENT DOCUMENTS

| | | | | |
|---|---|---|---|---|
| 4,611,126 | A * | 9/1986 | Miller | 307/64 |
| 4,983,955 | A * | 1/1991 | Ham et al. | 340/664 |
| 5,481,730 | A * | 1/1996 | Brown et al. | 713/340 |
| 6,456,511 | B1 * | 9/2002 | Wong | 363/21.13 |
| 6,528,957 | B1 * | 3/2003 | Luchaco | 315/307 |
| 6,683,441 | B2 | 1/2004 | Schiff et al. | 323/222 |
| 6,943,535 | B1 | 9/2005 | Schiff | 323/246 |
| 7,091,708 | B2 * | 8/2006 | Moussaoui | 323/272 |
| 2003/0227290 | A1 * | 12/2003 | Parker | 324/536 |
| 2003/0231009 | A1 * | 12/2003 | Nemoto et al. | 323/276 |
| 2005/0046440 | A1 * | 3/2005 | Phillips | 324/771 |

OTHER PUBLICATIONS

PCT International Search Report and Written Opinion of the International Searching Authority.

* cited by examiner

*Primary Examiner*—Kevin S Wood
(74) *Attorney, Agent, or Firm*—Robert F. Hightower

(57) ABSTRACT

A power supply monitoring system generates a monitor signal having information on more than one aspect of the power supply output. In one example embodiment, the monitor signal may be implemented as a square wave in which the duty cycle is proportional to output current, the peak amplitude is proportional to output voltage, and the average value is equal to output power.

22 Claims, 5 Drawing Sheets

POWER SUPPLY OUTPUT MONITOR

This application claims priority from U.S. Provisional Patent Application Ser. No. 60/683,919 entitled Switching Power Supply Output Monitor, filed May 23, 2005 which is incorporated by reference.

BACKGROUND

FIG. 1 illustrates a prior art multi-phase switching power supply with output current sensing as disclosed in U.S. Pat. No. 6,683,441. The system of FIG. 1 includes a controller 20 that generates switching control signals SC1 and SC2 to drive switch circuits 10 and 12, thereby controlling the amount of power delivered to the load 22 through inductors 14 and 16. Additional circuitry would typically be included to sense the output voltage $V_{OUT}$ so the controller can modulate the switch signals to maintain a constant output voltage regardless of the amount of current consumed by the load. The sensed output voltage is usually combined with an input signal to generate an error signal that is applied to the controller for closed-loop control of the output.

The system of FIG. 1 also includes a current sensing circuit 18 to generate a signal $V_{CS}$ that provides a measure of the total combined output current delivered to the load. The current sense signal may be used in numerous ways. For example, it may be used to provide over-current shutdown, it may be used to implement current-mode regulation, or it may be combined with voltage feedback to establish a droop impedance for adaptive voltage positioning (AVP) control schemes.

In some switching power supply systems, the current sense signal $V_{CS}$ may also be used to monitor the power consumed by the load. Since power may be computed by multiplying output voltage by output current, conventional techniques for power monitoring typically involve the use of an analog multiplier circuit (such as a Gilbert cell), or conversion of analog signals to digital information with multiplication performed in the digital domain. To facilitate power monitoring, existing systems may provide a current output signal that is an amplified version of a measured current signal, where amplification is either done digitally or with a simple continuous analog amplifier. Existing methods for producing current signals are straightforward, but require amplifiers with good electrical parameters. Also, to produce a ground referenced signal requires differential amplifiers or sampling techniques since most current sensing elements are not ground referenced or only have pertinent information part of the time.

DETAILED DESCRIPTION

Figure 1:
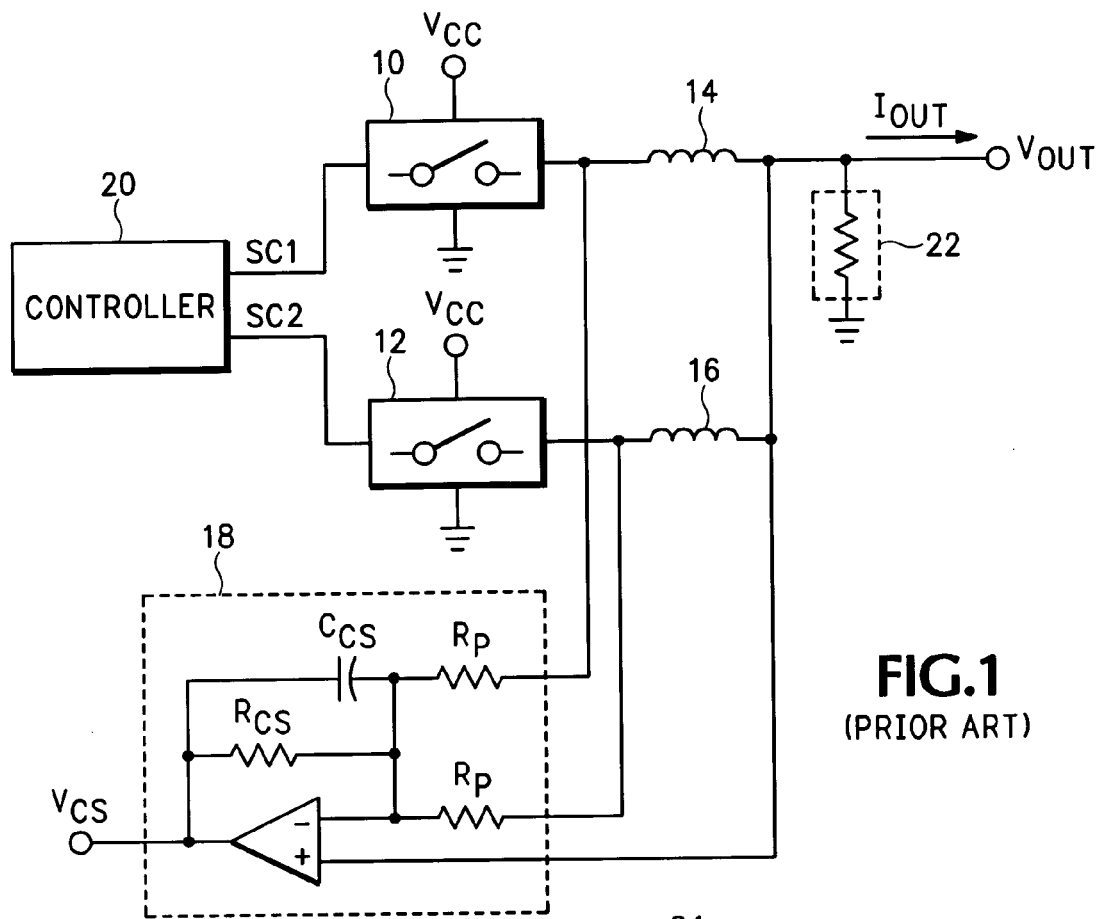
FIG. 1 illustrates a prior art switching power supply.
Figure 2:
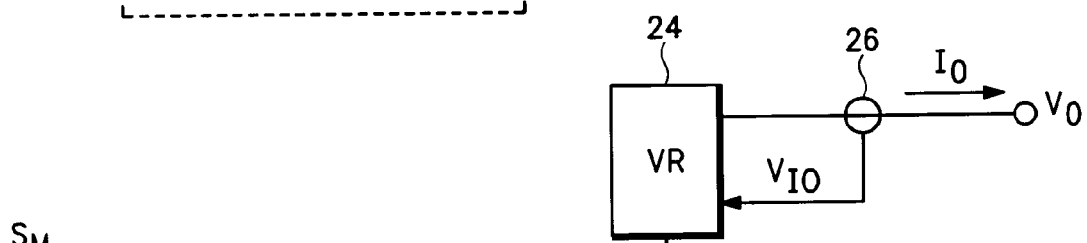
FIG. 2 illustrates an embodiment of a power supply system according to the inventive principles of this patent disclosure.

FIG. 2 illustrates an embodiment of a power supply system according to the inventive principles of this patent disclosure. In the embodiment of FIG. 2, a voltage regulator 24 generates an output signal which, in this example, is shown as a voltage-mode signal $V_O$. A sensor 26 monitors the output current $I_O$ from the regulator and generates a signal $V_{IO}$ that represents the output current and is fed back to the regulator. The regulator provides a monitor signal $S_M$ that may represent one or more aspects of the power supply output.

Figure 3:
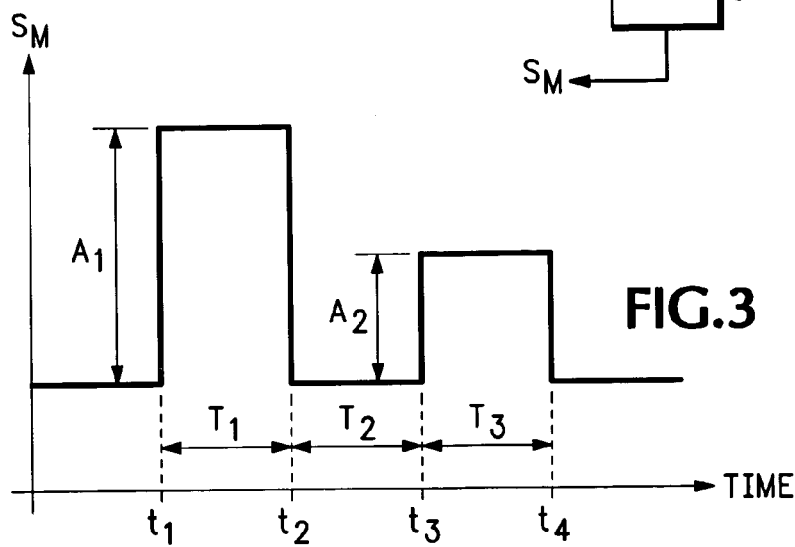
FIG. 3 illustrates an embodiment of a monitor signal according to the inventive principles of this patent disclosure.

For example, the monitor signal $S_M$ may be implemented as shown in FIG. 3 where each pulse in the waveform has an amplitude $A_1$, $A_2$, etc. that represents the output voltage, e.g., instantaneous, average, etc. The on-time duration of the pulses $T_1$, $T_3$, etc., may represent the current output. Alternatively, the output current may be related to the ratio of the on-time $T_1$ to the off-time $T_2$, or the ratio of the on-time $T_1$ to the total period $(T_1+T_2)$.

In addition to voltage and current output, the power output from the regulator may be related to various aspects of the monitor signal waveform. For example, if $A_1$ represents the regulator voltage output $V_O$, and the ratio of $T_1/(T_1+T_2)$ represents the regulator current output $I_O$, the power output may be obtained by multiplying $A_1$ by $T_1/(T_1+T_2)$. Other combinations of signal aspects may be utilized to provide monitoring according to the inventive principles of this patent disclosure.

The monitor signal $S_M$ is not limited to any particular mode, e.g., voltage-mode, current-mode. In some embodiments, the voltage and current aspects of the monitor signal may be readily obtained from signals that already exist inside the regulator or its auxiliary components. For example, the switch points $t_1$, $t_2$, etc., in the monitor signal waveform in FIG. 3 may be determined by watching for changes in the current flowing through an output inductor or a switching transistor. Likewise, the amplitude $A_1$ may be derived from monitoring the instantaneous, average, etc., output voltage.

Figure 4:
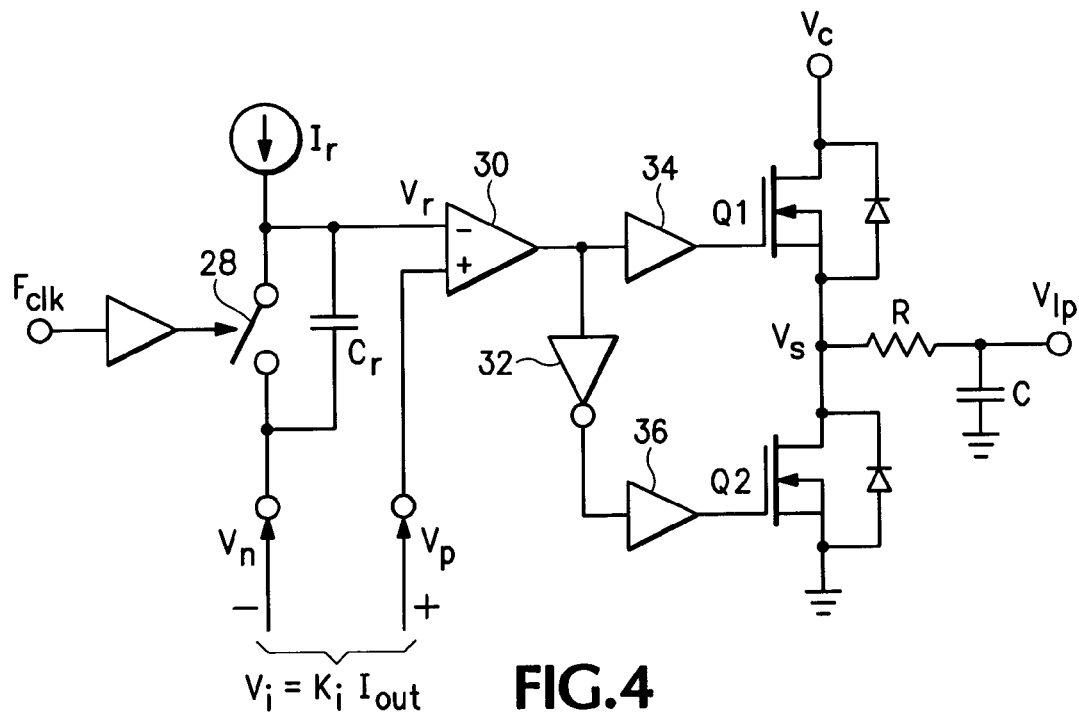
FIG. 4 illustrates an example embodiment of a switching power supply monitoring system according to the inventive principles of this patent disclosure.
Figure 5:
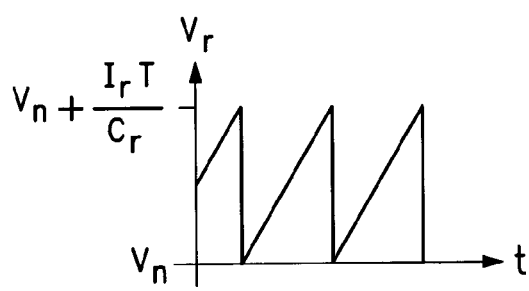
FIG. 5 illustrates a ramp signal in an example embodiment of a switching power supply monitoring system according to the inventive principles of this patent disclosure.
Figure 6:
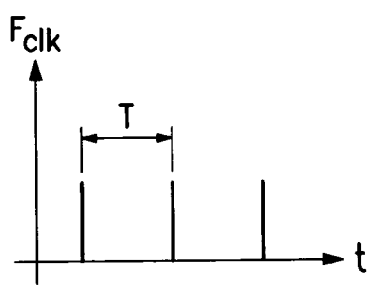
FIG. 6 illustrates a clock signal in an example embodiment of a switching power supply monitoring system according to the inventive principles of this patent disclosure.

FIG. 4 illustrates an example embodiment of a switching power supply monitoring system according to the inventive principles of this patent disclosure. A ramp signal $V_r$ having a common mode $V_n$ as shown in FIG. 5 is generated by charging a capacitor $C_r$ with a current $I_r$ and periodically discharging the capacitor through switch 28 in response to a clock signal $F_{clk}$ having a period T as shown in FIG. 6. The ramp signal is applied to one input, in this case, the inverting (−) input, of a comparator 30.

Figure 7:
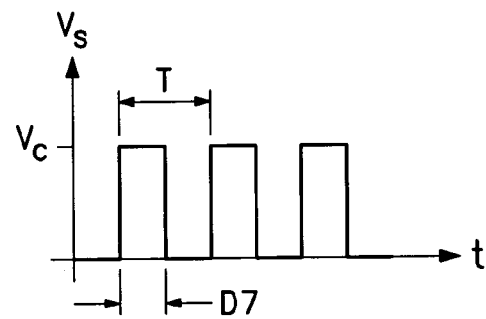
FIG. 7 illustrates a monitor signal in an example embodiment of a switching power supply monitoring system according to the inventive principles of this patent disclosure.

A signal $V_i$ that includes information on the total output current of the power supply may be applied to the comparator in various manners. In the example of FIG. 4, it is applied as a differential signal $V_i$ having an arbitrary common mode $V_n$ on top of which the ramp signal is added to generate the final ramp signal $V_r$ which is applied to the inverting (−) input of the comparator. The other side $V_p$ of the current signal $V_i$ is applied to the noninverting (+) input of the comparator. The output from the comparator drives two switching transistors Q1 and Q2 through inverter 32 and gate drivers 34 and 36 all of which form an output driver. This arrangement generates a modulated square wave signal $V_s$ as shown in FIG. 7 having a peak amplitude $V_c$ determined by the voltage applied to the output driver.

Figure 8:
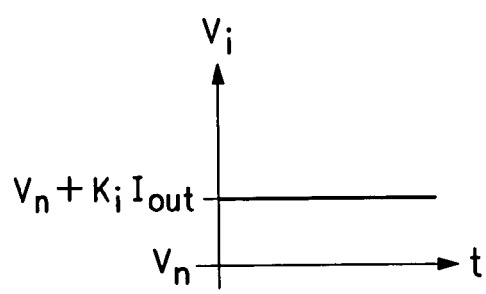
FIG. 8 illustrates a current representative signal in an example embodiment of a switching power supply monitoring system according to the inventive principles of this patent disclosure.

The current signal $V_i$ may be expressed as a voltage:

$$Vi = Ki \times Iout \qquad \text{(Eq. 1)}$$

as shown in FIG. 8 where $K_i$ is a constant and Iout is the output current of the switching power supply. The comparator output is on as long as $V_p > V_r$, where the on time (pulse width) for the signal $V_s$ is DT, that is, the duty cycle D times the period T as shown in FIG. 7. Solving for DT yields:

$$DT = \frac{Cr}{Ir}(Ki - Iout) \qquad \text{(Eq. 2)}$$

A system constant $A_r$ may also be defined as a gain factor:

$$Ar \equiv \frac{Cr}{Ir \times T} \qquad \text{(Eq. 3)}$$

The duty cycle D may then be expressed as follows:

$$D = Ar \times (Ki \times Iout) \qquad \text{(Eq. 4)}$$

Thus, the duty cycle is proportional to output current. In one embodiment, therefore, relative output current may be determined by monitoring the duty cycle, for example, with a timer.

Referring again to FIG. 4, a filter circuit including resistor R and capacitor C may filter the monitor signal $V_s$ to generate an output signal $V_{lp}$ that is equal to the average of $V_s$ as long as the averaging period is sufficiently greater than the period T. Solving for $V_{lp}$ in terms of the square wave yields:

$$Vlp = D \times Vc|_{RC \gg T} \qquad \text{(Eq. 5)}$$

and therefore:

$$Vlp = Ar \times Ki \times Iout \times Vc \qquad \text{(Eq. 6)}$$

If the output voltage is applied to the output driver as $V_c$, a multiplier function may be implemented to determine power by multiplying output voltage by output current. Thus, the embodiment of FIG. 4 may be configured to generate a single monitor signal in which: (1) the duty cycle is proportional to output current, (2) the peak amplitude is proportional to output voltage, and (3) the average value is equal to output power.

Although the embodiment of FIG. 4 illustrates a specific analog implementation of both the circuitry to generate the monitor signal, and the filter circuit, other embodiments may be implemented with other analog or digital hardware, software, etc., or combinations thereof, in accordance with the inventive principles of this patent disclosure.

Figure 9:
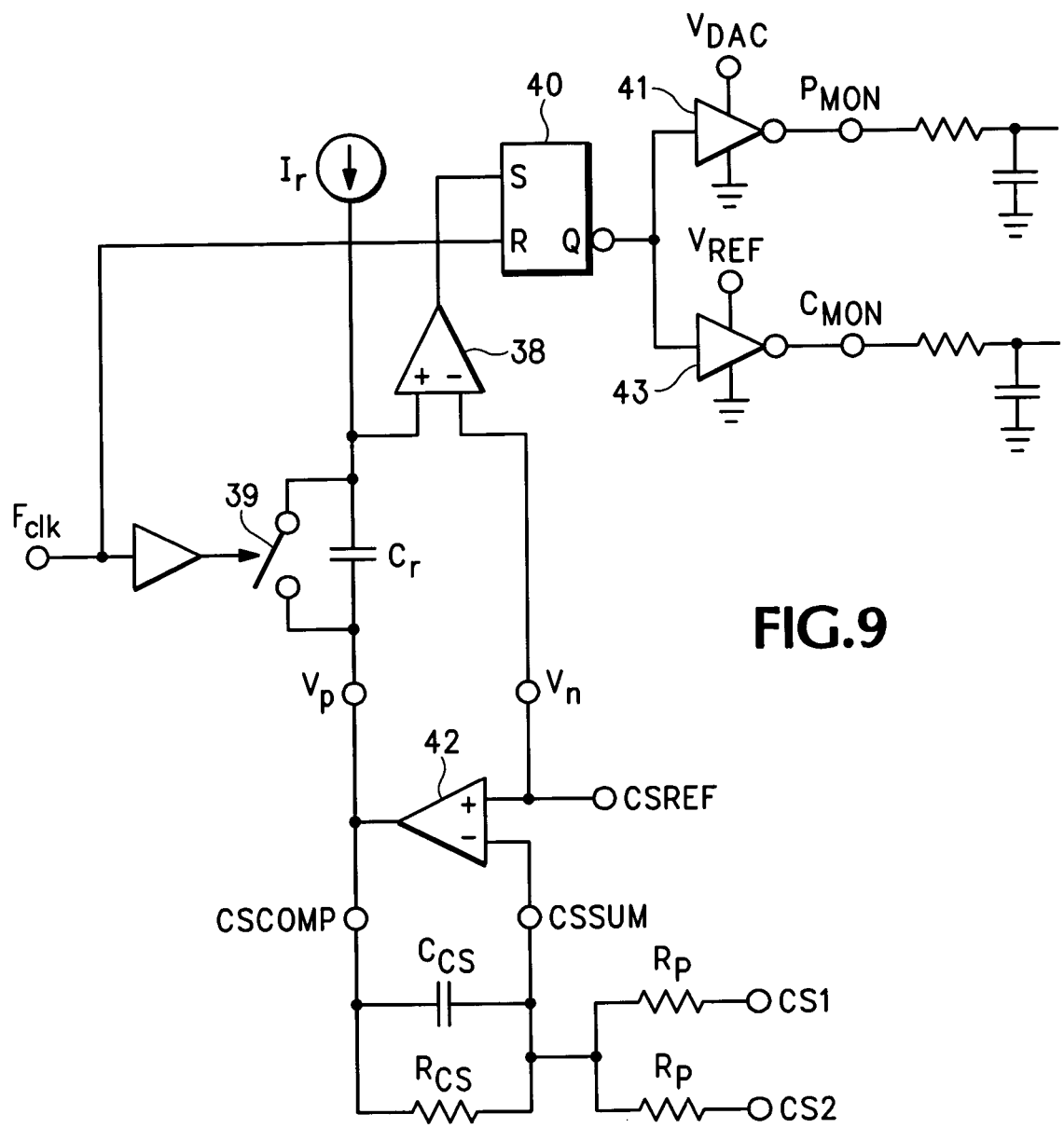
FIG. 9 illustrates another example embodiment of a switching power supply monitoring system according to the inventive principles of this patent disclosure.

FIG. 9 shows another example embodiment illustrating how a switching power supply monitoring system may be integrated with a switching power supply controller and takes advantage of signals that may already exist according to the inventive principles of this patent disclosure. The embodiment of FIG. 9 includes a current source $I_r$, capacitor $C_r$ and switch 39 to implement a ramp generator. Unlike the embodiment of FIG. 4, however, the ramp signal in the embodiment of FIG. 9 is applied to the noninverting (+) input of a comparator 38. The signal $V_i$, which includes information on the total output current of the power supply, is applied differentially to $V_p$ and $V_n$.

In this example, $V_i$ may be obtained from a current sense amplifier 42 as shown in FIG. 9 that may already exist in a switching power supply controller. In such an arrangement, which has a multi-phase output in this example, the noninverting (+) input terminal CSREF is referenced to the power supply output voltage $V_{OUT}$. Current sense inputs CS1 and CS2 are connected to output inductors or other current sensing elements and may be summed at the inverting (−) input terminal CSSUM of the amplifier. Resistor $R_{CS}$ and capacitor $C_{CS}$ provide a suitable time constant so that the output signal CSCOMP provides an accurate measure of the total power supply output current. The signals CSREF and CSCOMP may then by conveniently applied to the comparator as $V_p$ and $V_n$.

The output from comparator 38 is fed to the set S input of an R-S latch 40 which is reset by the clock signal $F_{clk}$. The latch output Q controls output drivers 41 and 43 which provide output signals PMON and CMON, respectively. A signal $V_{DAC}$, which may by provided from a digital-to-analog converter that supplies an input signal used as the setpoint for the switching regulator, is applied to output driver 41. Thus, the PMON signal is switched between ground and a signal that represents the power supply output, and thus, may provide a measure of the power supply output power using an RC filter network as shown in FIG. 9. With a stable reference voltage $V_{REF}$ applied to output driver 43, the CMON signal may provide a separate signal for monitoring the power supply output current.

Alternatively, a single output signal may be made reconfigurable according to the inventive principles of this patent disclosure. For example, the power signal applied to the output driver 41 in FIG. 9 may be user selectable through a multiplexer so that user may chose to apply the input signal $V_{DAC}$, the power supply output signal $V_{OUT}$, a reference signal $V_{REF}$, etc. to set the peak value of pulses in a square wave signal produced at PMON.

Figure 10:
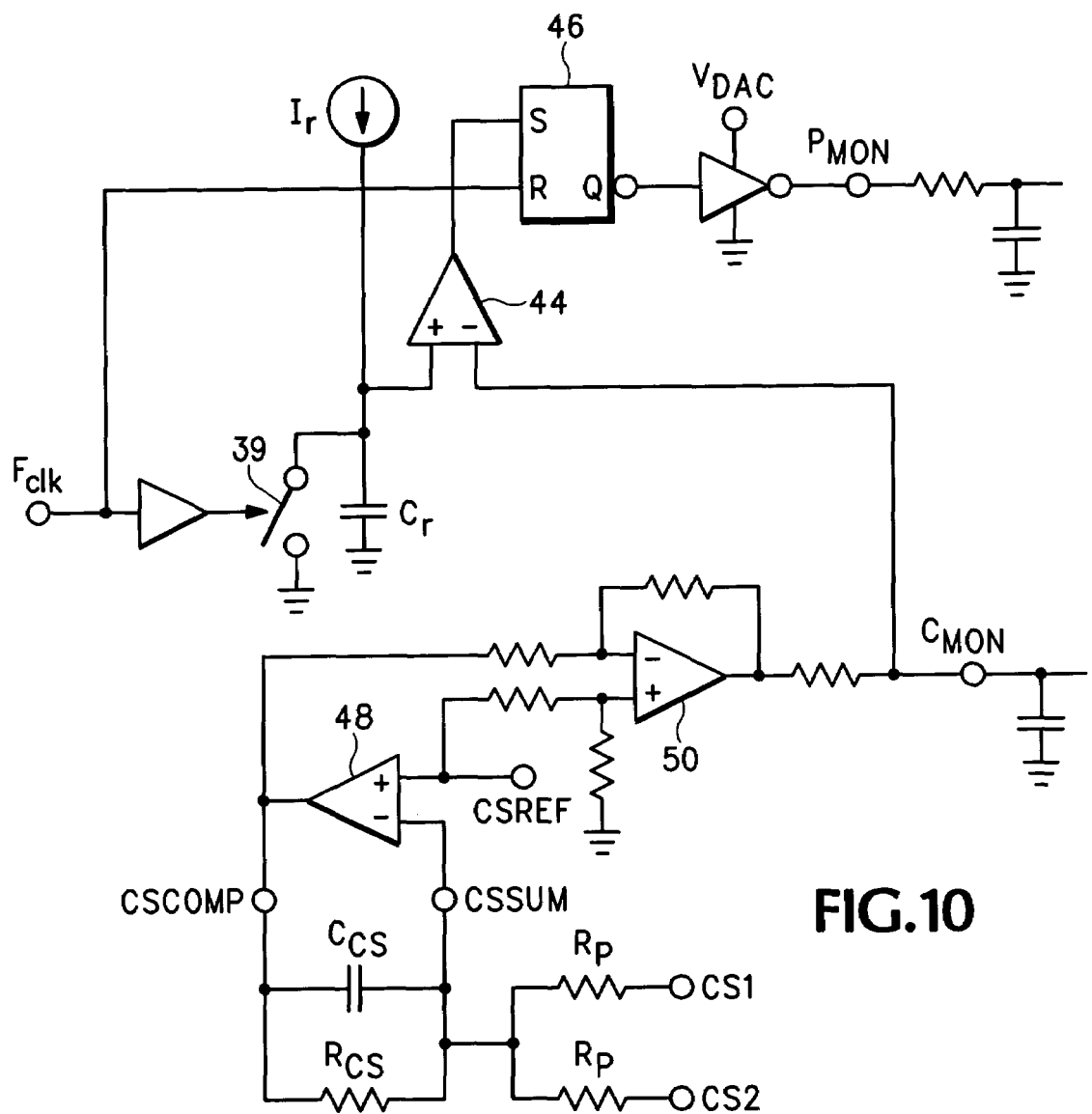
FIG. 10 illustrates another example embodiment of a switching power supply monitoring system according to the inventive principles of this patent disclosure.

FIG. 10 illustrates another example embodiment of a switching power supply monitoring system integrated with a current monitor circuit according to the inventive principles of this patent disclosure. In the embodiment of FIG. 10, the current representative signal $V_i$ is converted to a single-ended signal CMON by amplifier 50 and applied to the inverting (−) input terminal of comparator 44. The capacitor $C_r$ and switch 39 are referenced to ground, so the ramp signal $V_r$ is also single-ended and applied to the noninverting (+) input of the comparator. The remainder of the circuit operates in a manner similar to that of FIG. 9.

Figure 11:
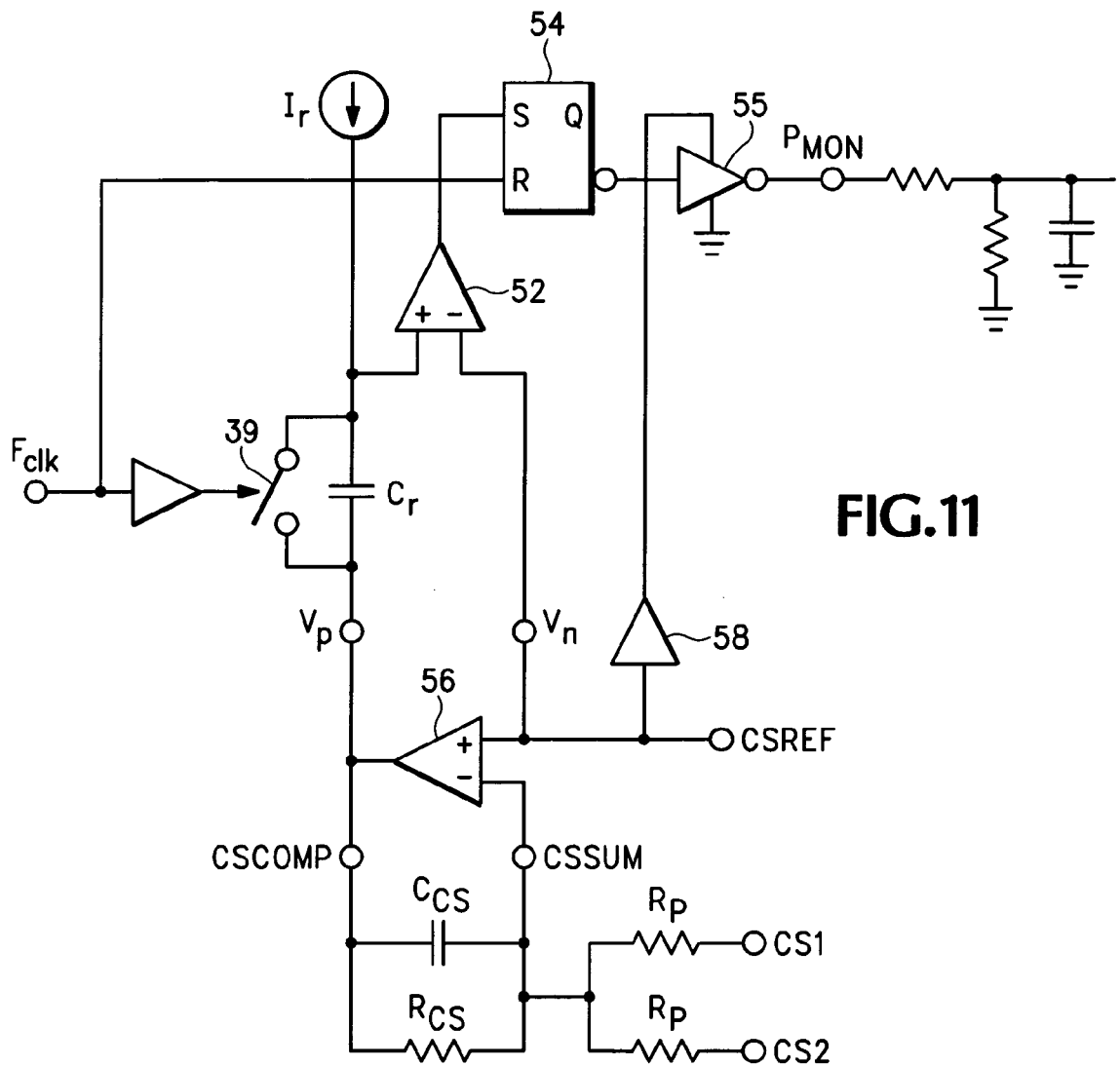
FIG. 11 illustrates another example embodiment of a switching power supply monitoring system according to the inventive principles of this patent disclosure.

FIG. 11 illustrates another example embodiment of a switching power supply monitoring system integrated with a current monitor circuit according to the inventive principles of this patent disclosure. The embodiment of FIG. 11 is in most respects similar to that of FIG. 9, but here, the power supply output voltage VOUT is applied to the output driver 55 through a buffer 58 to provide a direct measurement of the output voltage for the power monitor signal PMON.

Although embodiments according to the inventive principles of this patent disclosure are not limited to any particular physical form, the embodiments described above may be realized, for example, as an integrated circuit (IC) in which the monitor signal, for example, $S_M$, PMON, or CMON, etc. may be provided to the user at a terminal pin. The embodiments of power supply monitor systems may be fabricated as part of an IC including a switching power supply controller, or they may be implemented as separate parts. For example, in the embodiment of FIG. 11, the current sense amplifier 56, comparator 52, latch 54 and output driver 55 may be fabricated on an IC with other power supply control circuitry, and with PMON, CSREF, CSSUM, and CSCOMP brought out of the IC package as terminal pins, in which case the user would supply external components $C_{CS}$, $R_{CS}$, $R_P$, etc., as required for the particular application. The clock signal $F_{clk}$ may be generated locally, or derived from other clock signals associated with a power supply controller. As a further example, the inventive principles are not limited to switching power supplies, but may also be applied to any power supply where output current and output voltage information are available.

Since the embodiments described above can be modified in arrangement and detail without departing from the inventive concepts, such changes and modifications are considered to fall within the scope of the following claims.

The invention claimed is:

1. A DC power supply monitoring system comprising:
   a power supply controller configured to form a control signal used for regulating an output voltage on a power supply output to a desired value, the power supply controller configured to receive a first sense signal that is representative of a value of the output voltage and to receive a second sense signal that is representative of a load current supplied to a load;
   a monitoring circuit configured to generate a monitor signal responsively to the first sense signal and the second sense signal, the monitor signal having a pulse waveform with information on more than one aspect of the power supply output represented in a single pulse cycle of the monitor signal wherein an amplitude and a time interval of the single pulse cycle represents the information.

2. The system of claim 1 wherein the monitoring circuit is configured to form the monitor signal and wherein the information includes load current and output voltage information for the power supply output.

3. The system of claim 2 wherein a first aspect of the monitor signal includes output voltage information; and
   a second aspect of the monitor signal includes load current information.

4. The system of claim 3 wherein
   the first and second aspects may be combined to provide power information.

5. The system of claim 1 wherein the monitoring circuit is configured to form the monitor signal and wherein the amplitude of the single pulse cycle represents output voltage information, a duty cycle of the single pulse cycle represents load current information, and the amplitude times the duty cycle represents power information.

6. The system of claim 1 wherein the monitoring circuit is configured to form the monitor signal and wherein the amplitude of the single pulse cycle represents the load current information, a duration of the single pulse cycle represents output voltage information, and the amplitude times the duration represents power information.

7. The system of claim 1 wherein the monitoring circuit is configured so that the monitor signal may be reconfigured by a user.

8. The system of claim 1 wherein the monitoring circuit includes an output driver to establish the amplitude of the single pulse cycle in response to an aspect of the power supply output.

9. The system of claim 8 where the output driver includes a pair of transistors arranged to switch the monitor signal between a first voltage and a second voltage.

10. The system of claim 9 further including a filter circuit coupled to the output driver.

11. The system of claim 1 wherein the monitoring circuit includes a pulse generator arranged to create pulses of the monitor signal in response to an aspect of the power supply output.

12. The system of claim 11 where the pulse generator includes a comparator having a ramp signal applied to a first input of the comparator.

13. The system of claim 12 wherein a signal having information on the aspect of the power supply output is applied to a second input of the comparator.

14. The system of claim 12 where a signal having information on the power supply output is combined with the ramp signal.

15. The system of claim 12 where a signal having information on the aspect of the power supply output is applied differentially to the first input and a second input of the comparator.

16. The system of claim 1 wherein the power supply controller is a switching power supply.

17. The system of claim 1 wherein the monitoring circuit includes first means for modulating a square wave signal with information on a first aspect of the power supply output; and
   second means for modulating the square wave signal with information on a second aspect of the power supply output.

18. The system of claim 17 where the first means for modulating comprises an output driver having means for switching the square wave signal between two voltages in response to the first aspect of the power supply output.

19. The system of claim 17 where the second means for modulating comprises:
   means for providing a ramp signal; and
   means for comparing the ramp signal to a second signal.

20. The system of claim 19 where the second means for modulating further comprises means for modulating the ramp signal with information on the second aspect of the power supply output.

21. The system of claim 19 where the second means for modulating further comprises means for modulating the second signal with information on the second aspect of the power supply output.

22. The system of claim 19 wherein the power supply controller is a switching power supply controller.

* * * * *